United States Patent [19]

Aubrecht

[11] Patent Number: 4,631,430
[45] Date of Patent: Dec. 23, 1986

[54] LINEAR FORCE MOTOR

[75] Inventor: Richard A. Aubrecht, Orchard Park, N.Y.

[73] Assignee: Moog Inc., East Aurora, N.Y.

[21] Appl. No.: 745,122

[22] Filed: Jun. 17, 1985

[51] Int. Cl.$^4$ .............................................. H02K 41/00
[52] U.S. Cl. ........................................ 310/12; 310/14; 310/30; 310/24; 318/122
[58] Field of Search ...................... 310/23, 29, 30, 15, 310/14, 12; 318/122, 123, 124, 125, 135

[56] References Cited

U.S. PATENT DOCUMENTS

| | | | |
|---|---|---|---|
| 3,119,940 | 1/1964 | Pettit et al. | 310/24 |
| 3,241,006 | 3/1966 | Boyko | 310/14 X |
| 3,425,009 | 1/1969 | Voigt et al. | 310/14 X |
| 3,518,463 | 6/1970 | Abbott | 310/30 X |
| 3,670,223 | 6/1972 | Pommeret | 310/30 X |
| 3,699,365 | 10/1972 | Leitgeb | 310/12 |
| 3,755,699 | 8/1973 | Cartwright | 310/12 |
| 3,805,099 | 4/1974 | Kelly | 310/12 |
| 3,894,817 | 7/1975 | Majoros et al. | 310/30 X |
| 3,931,554 | 1/1976 | Spentzas | 318/122 |

Primary Examiner—Donovan F. Duggan
Attorney, Agent, or Firm—Sommer & Sommer

[57] ABSTRACT

A linear force motor has an elongated body provided with an annular chamber therewithin. An armature is arranged within the chamber for axial movement relative thereto. Two axially-spaced permanent magnets, with their like poles arranged to face one another, are arranged within the body radially inwardly of the chamber, and are separated by a common polepiece. The force motor has four axially-spaced active air gaps, arranged in various reciprocal pairs and various parallel pairs. When the armature is shifted one direction relative to the body, the majority of each magnet's static flux passes through one parallel pair of air gaps. When the armature is shifted in the other direction relative to the body, the majority of each magnet static flux passes through the other parallel pair of air gaps. The motor has one or more coils operatively arranged to generate control flux in a path which passes through at least one reciprocal pair of air gaps. The control flux, when superimposed on the static flux pattern, creates a net flux, which urges the armature to move in a desired direction relative to the body.

23 Claims, 20 Drawing Figures

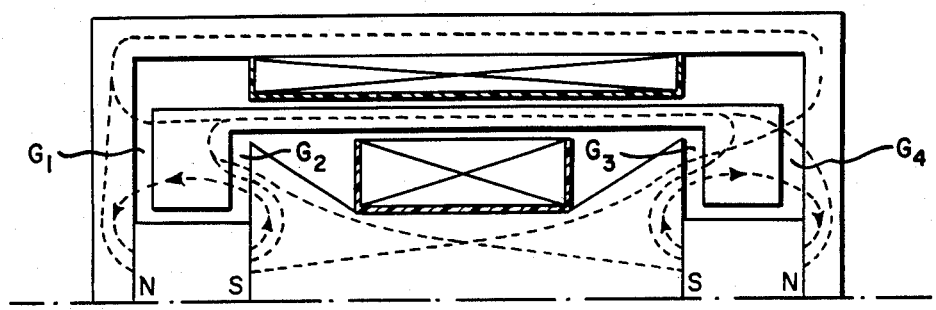
Fig. 6b.
Fig. 6c.
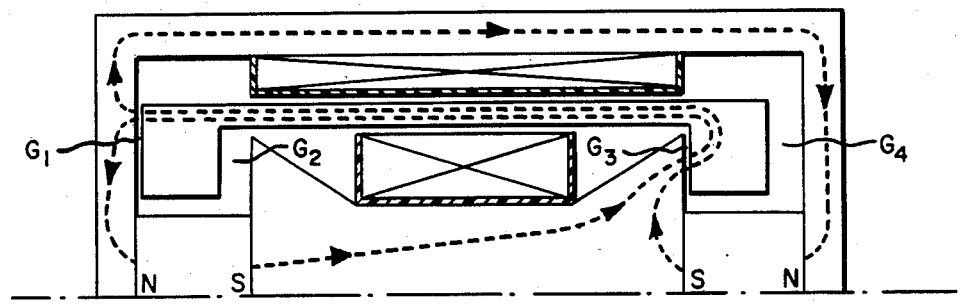
Fig. 6d.
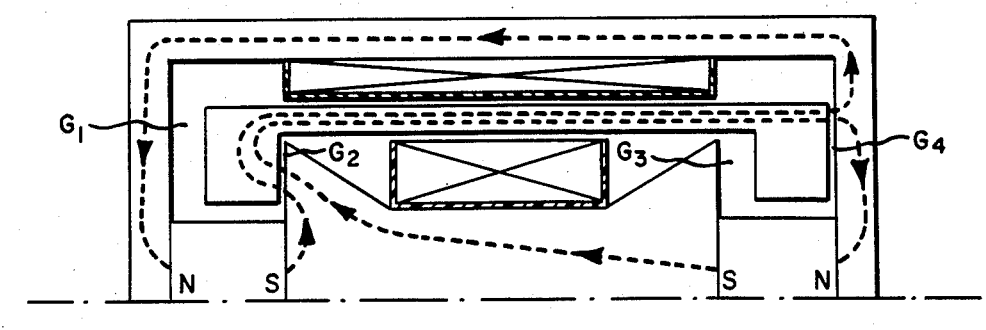

LINEAR FORCE MOTOR

BACKGROUND OF THE INVENTION

1. Field of the Invention

The present invention relates generally to the field of electromechanical motors and actuators, and, more particularly, to an improved linear force motor having four active air gaps.

2. Description of the Prior Art

Many forms of electromechanical force and torque motors have been developed heretofore. These have changed from simple solenoid devices to more-complicated torque motors. Such torque motors are representatively shown and described in U.S. Pat. No. 3,023,782. The operation of such torque motors was the subject of applicant's doctoral thesis entitled, "Static and Dynamic Characteristics of Electromechanical Torque Motors", Order No. 70-14370, Cornell University (1970).

Other details of a two air gap linear force motor are shown and described in pending U.S. patent application Ser. No. 06/537,109, filed Sept. 29, 1983, and entitled "Electro-Mechanical Actuator", which application has been assigned to the assignee of this application.

SUMMARY OF THE INVENTION

The present invention provides an improved linear force motor, which broadly comprises: a body having an elongated annular chamber therewithin; an armature arranged within this chamber for axial movement relative to the body, the body and armature having surfaces cooperating to form first, second, third and fourth active air gaps therebetween, the first and second air gaps being arranged in one reciprocal pair such that the sum of their lengths is constant, the third and fourth air gaps being arranged in another reciprocal pair such that the sum of their lengths is constant, the first and third air gaps forming one parallel pair such that their lengths vary proportionally when the armature moves relative to the body, and the second and fourth air gaps forming another parallel pair such that their lengths vary proportionally when the armature moves relative to the body; magnet means, such as two axially-spaced high-reluctance samarium cobalt magnets, mounted on the body and operatively arranged to provide static flux in the air gaps; and at least one coil arranged in the chamber and selectively energizable to produce control flux in one path which passes through the first and fourth air gaps and in another path which passes through the second and third air gaps.

Accordingly, the general object of the present invention is to provide an improved linear force motor.

Another object is to provide an improved linear force motor having four active air gaps.

Another object is to provide an improved linear force motor which is capable of exerting an increased force on the armature, as compared to other known forms of linear force motors.

These and other objects and advantages will become apparent from the foregoing and ongoing written specification, the drawings, and the appended claims.

BRIEF DESCRIPTION OF THE DRAWINGS

FIG. 6b is an unsectioned view of the outline of the upper portion of the force motor shown in FIG. 6, showing the armature in a centered position relative to the body such that all four air gaps are of substantially equal length, showing the coil flux path, and visually depicting the long and short flux loops of each magnet.

FIG. 6c is an unsectioned view of the upper portion of the force motor shown in FIG. 6, but showing the armature as having been shifted leftwardly relative to the body from the centered position shown in FIG. 6b, and visually depicting the paths and dominance of the long flux loops of each magnet when the armature is in this position.

FIG. 6d is an unsectioned view of the upper portion of the force motor shown in FIG. 6, but showing the armature as having been shifted rightwardly relative to the body from the centered position shown in FIG. 6b, and further showing the paths and dominance of the first and second magnet long loops when the armature is in this position.

DESCRIPTION OF THE PREFERRED EMBODIMENTS

Figure 1:
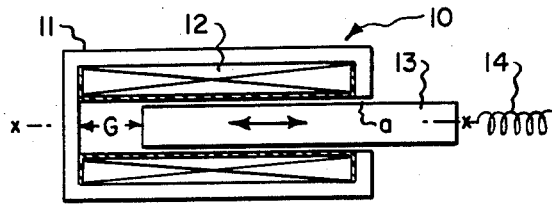
FIG. 1 is a schematic view of a first form of a known prior art force motor having a single active air gap.

At the outset, it should be clearly understood that like reference numerals are intended to identify the same elements, portions, and surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification and are to be considered as a portion of the entire "written description" of this invention, as required by 35 U.S.C. § 112. As used in the following description, the terms "left", "right", "up" and "down", as well as adjectival and adverbial derivatives thereof (e.g., "leftwardly", "rightwardly", etc.), refer to the orientation of the illustrated structure as the particular drawing figure faces the reader. Similarly, the terms "inwardly" and "outwardly" refer to the orientation of a surface relative to its axis of elongation.

Figure 6:
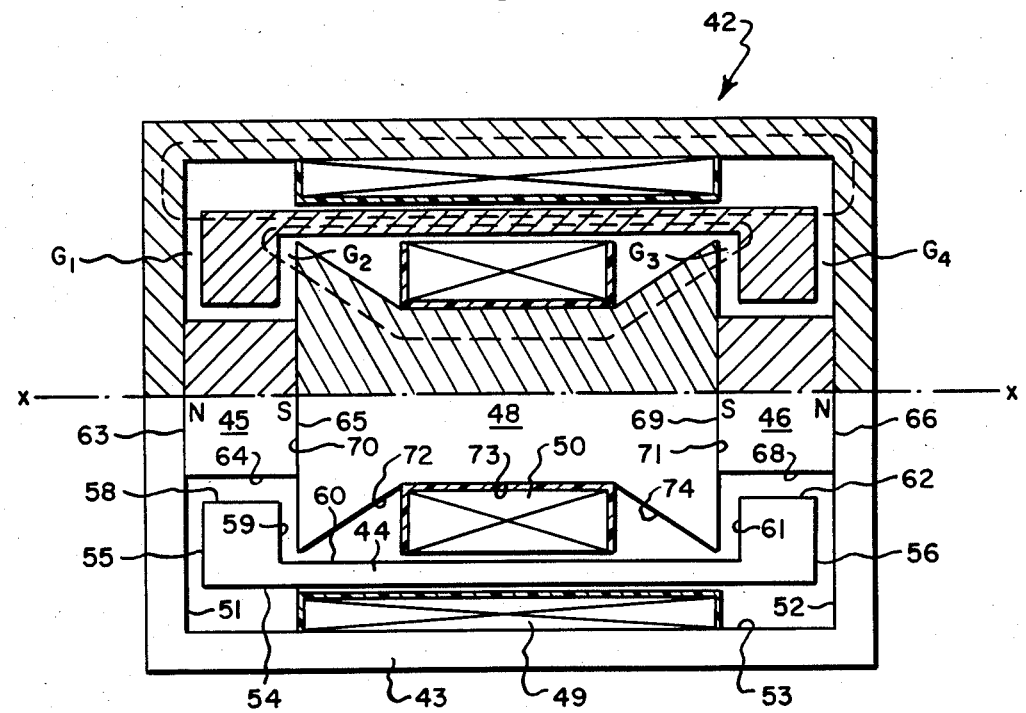
FIG. 6 is a schematic longitudinal vertical view taken through a first form of an improved linear force motor, this embodiment having four axially-spaced air gaps, with the upper portion thereof being shown in section and the lower portion thereof being unsectioned.
Figure 7:
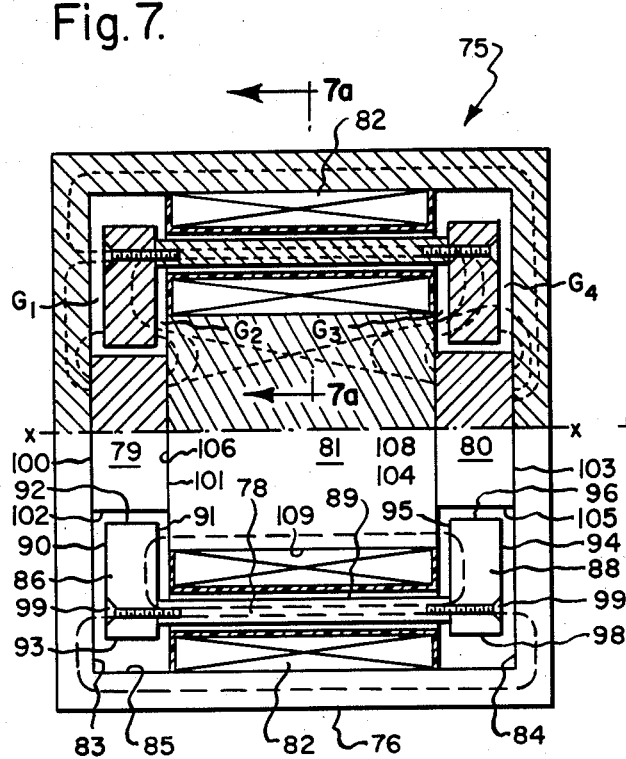
FIG. 7 is a schematic longitudinal vertical view taken through a second form of an improved linear force motor again having four axially-spaced active air gaps, the upper portion being sectioned and the lower portion being unsectioned.
Figure 7A:
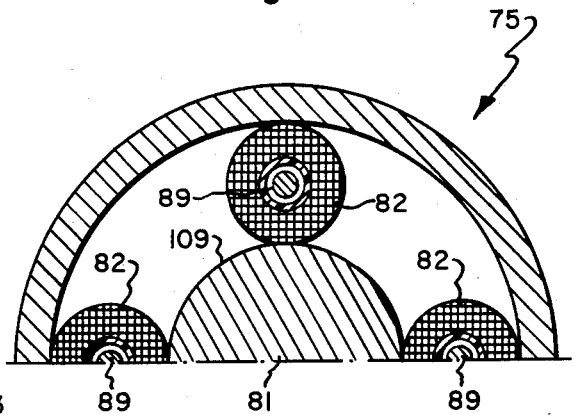
FIG. 7a is a fragmentary transverse vertical sectional view thereof, taken generally on line 7a–7a of FIG. 7, and principally showing a coil encircling each of the armature rods.

Referring now to the drawings, this invention provides an improved linear force motor, of which a first preferred embodiment is shown in FIG. 6 and a second preferred embodiment is shown in FIG. 7. However, before discussing the inventive embodiments, a review of various known forms of prior art force and torque motors may assist the reader in understanding the significance of the improvements disclosed and claimed herein.

Prior Art Force/Torque Motors (FIGS. 1-5)

FIG. 1 depicts an elementary form of a known solenoid-type force motor 10 which had a somewhat C-shaped body 11, a coil 12 arranged within the body, and a cylindrical armature 13 mounted within the coil for bi-directional movement along horizontal axis x-x against the bias of a spring 14. When the coil was deenergized, and assuming that no other external load acted on the armature, spring 14 biased the armature to a particular axial position relative to the body. However, the coil could be selectively energized with an appropriate current, of desired polarity and magnitude, to create a control flux, which encircled the coil by passing through the body, an axial active air gap G between the body and the circular left end face of the armature, the armature itself, and an inactive radial air gap "a" between the body and a proximate portion of the armature's cylindrical outer surface. By selectively controlling the current supplied to the coil, the control flux could be used to create a force urging the armature to move either leftwardly or rightwardly, as desired, relative to the body. While the body and armature were formed of flux-conductive materials, the two air gaps provided resistance to flux passage. The reluctance (R) of an air gap could be calculated according to the equation:

$$R = [L/(\mu A)]$$

where L represents the length of the air gap, $\mu$ represents the permeability of the gap, and A represents the cross-sectional area of the gap. Thus, in FIG. 1, the radial air gap "a" was deemed to be "inactive" because its length and cross-sectional area remained substantially constant at all operative positions of the armature relative to the body. However, this was not true of the "active" air gap G. Here, while the cross-sectional area of gap G remained substantially constant, its length depended on the axial position of the armature relative to the body. As the armature moved rightwardly relative to the body, the length of gap G, and hence its reluctance ($R_G$), increased. Conversely, when the armature moved leftwardly relative to the body, the reluctance of gap G decreased. In other words, while the inactive air gap "a" was of substantially constant reluctance ($R_a$), the active air gap G was of variable reluctance ($R_G$).

Figure 1A:
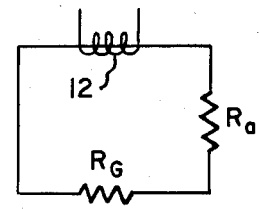
FIG. 1a is a magnetic circuit of the force motor shown in FIG. 1.

FIG. 1a is a magnetic circuit of the structure shown in FIG. 1. It can readily be seen that the control flux generated by the coil was forced to pass sequentially through gaps "a" and G. Hence, the equivalent magnetic circuit was a single loop with $R_a$ and $R_G$ being in series with the coil. In such a magnetic circuit, the flux ($\phi$) is analogous to a current, and the reluctance (R) is analogous to a resistance. It was also known that the force (F) on the armature exerted by the flux ($\phi$) passing through an air gap of cross-sectional area A, could be calculated according to the equation:

$$F = [\phi^2/(2A\mu)]$$

Thus, the force exerted on the armature increased proportionally to the square of the flux in the air gap.

Figure 2:
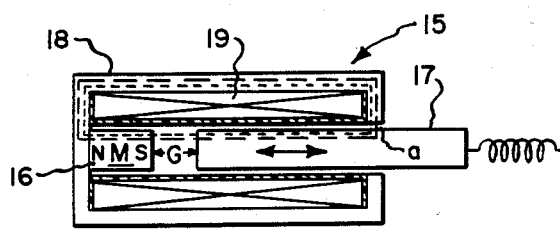
FIG. 2 is a schematic view of a second form of a known prior art linear force motor having a magnet arranged in series with a single active air gap.
Figure 2A:
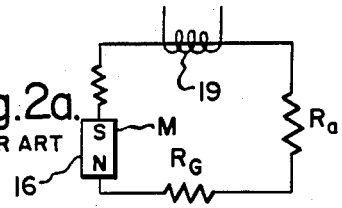
FIG. 2a is a magnetic circuit of the force motor shown in FIG. 2.

Referring now to FIGS. 2 and 2a, the next evolutionary step was to provide a solenoid-type linear force motor 15 with a permanent magnet 16 positioned axially in the active air gap G. The magnet produced a static flux which passed through the active air gap, the armature 17, the inactive radial air gap "a", and the body 18, as shown by the dotted line in FIG. 2. However, when coil 19 was energized, the control flux was forced to pass through the magnet itself, which was of a permeability ($\mu$) different than that of the body and armature and different from that of the air gaps. Specifically, the control flux would encircle the coil by passing through the body, the magnet M, the active air gap G, the armature, and the inactive air gap "a", as shown by the dashed line in FIG. 2. Thus, the coil could be selectively energized with a suitable current, of desired polarity and magnitude, to create a control flux, again of desired magnitude and direction, which, when superimposed on the static flux, created a net flux in the active air gap G.

The equivalent magnetic circuit is shown in FIG. 2a. The magnet M had a reluctance ($R_M$) which was arranged in series with the reluctances of the active air gap ($R_G$) and the inactive air gap ($R_a$). Thus, the magnet produced a static flux which passed through both air gaps, while the control flux produced by the coil was forced to pass through both air gaps and the magnet itself.

Figure 3:
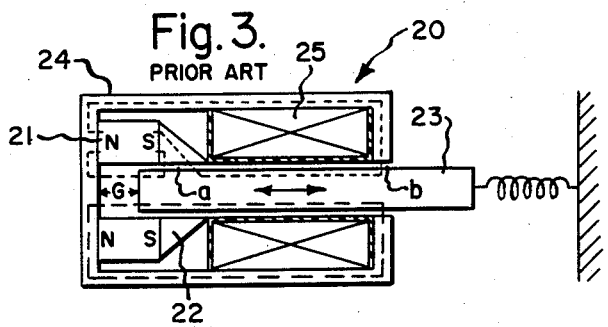
FIG. 3 is a schematic view of a third form of a known prior art force motor with an annular magnet arranged in parallel with a single active air gap.
Figure 3A:
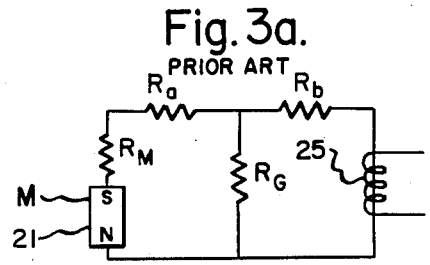
FIG. 3a is a magnetic circuit of the force motor shown in FIG. 3.

Referring now to FIGS. 3 and 3a, the next design advancement was to provide a force motor 20 having an annular permanent magnet 21 positioned about the active air gap G so that the magnet was arranged in parallel with that gap, rather than being in series with it. Thus, the static flux produced by magnet 21 would divide between a short loop, which passed through polepiece 22, and "inactive" radial air gap "a", armature 23, the active air gap G, and body 24, and in another long loop which passed through polepiece 22, air gap "a", the armature, air gap "b", and the body. These two static flux paths are illustrated by the dotted lines in FIG. 3. When energized, the coil 25 produced a control flux which could encircle the coil by passing along two possible paths. The first path included armature 23, an inactive air gap "b" (i.e., the radial distance between the outwardly-facing cylindrical surface of the armature and the proximate inwardly-facing cylindrical surface of the body), the body, and the active air gap G. The second path included armature 23, air gap "b", the body, the magnet, the polepiece 22, and inactive air gap "a".

The equivalent magnetic circuit is shown in FIG. 3a. Here again, the magnet had a reluctance ($R_M$), which depended inter alia on the material on which it was formed. In any event, flux issuing from the magnet's South pole (S) could return to the opposite North pole (N) by passing through reluctances $R_a$ and $R_G$. At the same time, the control flux could pass through two paths. The first path included $R_b$ and $R_G$, and the second included $R_b$, $R_a$ and $R_M$. Thus, while the control flux would divide between these two paths, the preferred flux path was the one of least resistance. If magnet M was formed of a rare earth alloy, such as samarium cobalt, its reluctance might well be substantially greater than the sum of $R_G$ and $R_b$. Hence, the majority of the control flux would pass through the nearer lower-reluctance loop including $R_b$ and $R_G$, rather than pass through the distant higher-reluctance loop which included $R_M$. This former path of least reluctance is represented by the dashed line in FIG. 3.

Figure 4:
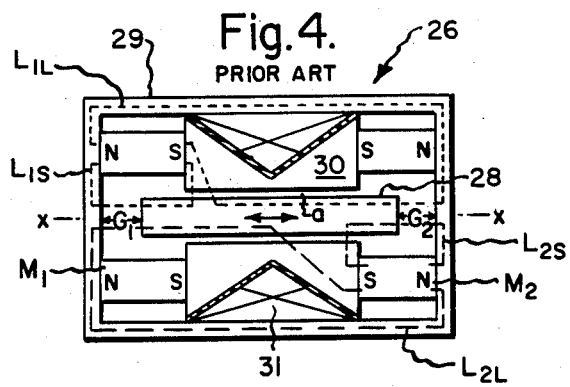
FIG. 4 is a schematic view of a fourth form of a known prior art force motor, this form having a pair of axially-spaced annular magnets arranged in parallel with a pair of axially-spaced active air gaps.
Figure 4A:
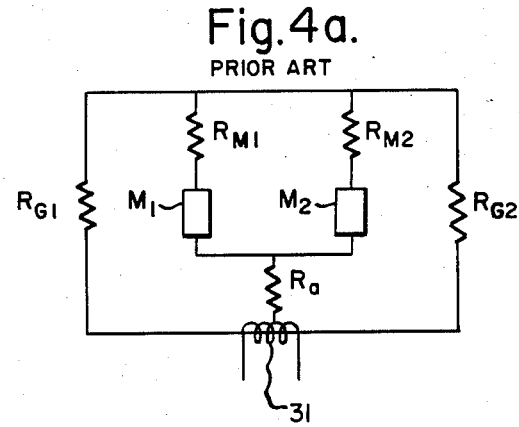
FIG. 4a is a magnetic circuit of the force motor shown in FIG. 4.

Referring now to FIGS. 4 and 4a, the next step was to develop a force motor 26 having two active air gaps $G_1$, $G_2$ between the left and right end faces of the armature 28 and the body 29, respectively, and to provide permanent magnets, $M_1$, $M_2$ in parallel with such air gaps. The two magnets were physically separated from one another by an intermediate common polepiece 30 having an annular V-shaped recess extending radially inwardly from its outer surface. The armature was slidably mounted within this polepiece for horizontal motion relative thereto along axis x-x. A coil 31 was mounted in the annular recess of the polepiece, and the body encircled the entire structure. The magnets were typically formed of a rare earth alloy, such as samarium cobalt, which had a permeability to flux passage on the same order of magnitude as that of air. In the equivalent magnetic circuit, therefore, the flux saw each magnet as being equivalent to an air gap having a reluctance greater than that of either active air gap. Thus, the leftward air gap $G_1$ had a reluctance $R_{G1}$ which depended on its length, the rightward air gap $G_2$ had a reluctance $R_{G2}$ which depended on its length, and the inactive radial air gap "a" between the armature and the polepiece had a substantially constant reluctance $R_a$.

Each magnet created static flux in a short loop which passed through the adjacent active air gap, and in a long loop which passed through the distant air gap, these loops being represented by the dotted lines in FIG. 3. The first magnet short loop ($L_{1S}$) took a path through the polepiece, the radial air gap "a", the armature, left active air gap $G_1$, and a proximate portion of the body. The first magnet long loop ($L_{1L}$) took a path which passed through the polepiece, radial air gap "a", the armature, right air gap $G_2$, and the outer portion of the body. Conversely, the second magnet short loop ($L_{2S}$) took a path through the polepiece, radial air gap "a", the armature, the right active air gap $G_2$, and a proximate portion of the body. The second magnet long loop ($L_{2L}$) took a path through the polepiece, radial air gap "a", the armature, left air gap $G_1$, and the outer portion of the body. Thus, each magnet produced static flux in a short loop which passed through the adjacent air gap, and in a long loop which passed through the distant air gap. Because each magnet had a higher reluctance than the maximum reluctance of the adjacent air gap, these four loops were the possible paths of least resistance. When the coil was energized, the control flux would encircle the coil by passing through the body, right air gap $G_2$, the armature, and left air gap $G_1$. Thus, because of the higher reluctances of the magnets, the majority of the control flux pass through both active air gaps, rather than pass through the magnets themselves. This preferred path of control flux is shown by the dashed line in FIG. 4. When the armature moved either leftwardly or rightwardly from the centered position shown in FIG. 4, the length of one active air gap would decrease at the expense of correspondingly increasing the length of the other active air gap. The effect of this was to increase the flux in the now-narrowed air gap because the fluxes in the proximate magnet short loop and in the distant magnet long loop would be increased, again at the expense of a decrease in the fluxes in the proximate magnet long loop and the distant magnet short loop. Thus, while the paths of flux travel remained constant, the magnitudes of the static fluxes depended upon the position of the armature relative to the body. One device of this type is shown in pending U.S. patent application Ser. No. 06/537,109, filed Sept. 29, 1983, and entitled "Electro-Mechanical Actuator".

As shown in the equivalent magnetic circuit of FIG. 4a, magnets $M_1$, $M_2$ had reluctances $R_{M1}$, $R_{M2}$, respectively. The flux in the first magnet short loop ($L_{1S}$) encountered reluctance $R_a$ of radial air gap "a", and the reluctance $R_{G1}$ of active air gap $G_1$, while the flux in the first magnet long loop ($L_{1L}$) encountered $R_a$ and the reluctance $R_{G2}$ of the distant air gap. Conversely, the flux in the second magnet short loop ($L_{2S}$) encountered $R_a$ and $R_{G2}$, while the flux in the second magnet long loop encountered $R_a$ and $R_{G1}$. However, when energized, the path of least resistance of the coil flux was through $R_{G1}$ and $R_{G2}$, because the reluctances $R_{M1}$ and $R_{M2}$ of the two magnets were higher.

Figure 5:
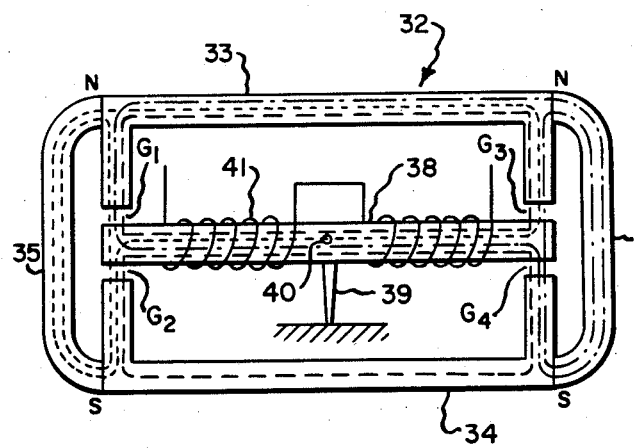
FIG. 5 is a schematic view of a fifth form of a known prior art torque motor, this embodiment having a pivotal armature, four active air gaps, and a pair of magnets arranged in parallel with reciprocal pairs of the air gaps.
Figure 5A:
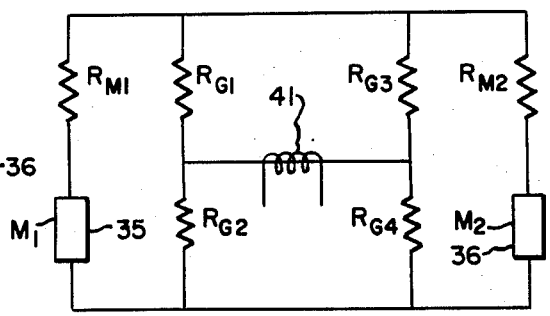
FIG. 5a is a magnetic circuit of the torque motor shown in FIG. 5.

FIGS. 5 and 5a illustrate a known form of torque motor 32, such as typically shown and described in U.S. Pat. No. 3,023,782. A detailed analysis of the operation of such a torque motor may be found in applicant's doctoral thesis entitled, "Static and Dynamic Characteristics of Electromechanical Torque Motors", Order No. 70-14370, Cornell University (1970).

The torque motor had channel-shaped upper and lower polepieces 33,34, respectively, arranged in spaced facing relation to one another, with C-shaped permanent magnets 35,36, joining their ends. The South poles (S) of the magnets joined the lower polepiece 34 and were arranged to face one another. A horizontally-elongated armature 38 was mounted on a flexure tube, schematically indicated at 39, and effectively pivoted about intermediate point 40. A coil 41 encircled the armature. The distal ends of the armature were arranged between the facing surfaces of the polepieces. Thus, the left end of the armature defined one pair of reciprocal upper and lower active air gaps $G_1$, $G_2$, respectively, and the right end thereof defined another pair of reciprocal upper and lower air gaps $G_3$, $G_4$, respectively. Thus, gaps $G_1$, $G_2$ were arranged in one reciprocal pair, and gaps $G_3$, $G_4$ were arranged in another reciprocal pair, such that as the armature moved rotatably about pivot point 40, one gap of each reciprocal pair would be narrowed at the expense of correspondingly increasing the length of its reciprocal pair mate. At the same time, diametrically-opposite gaps $G_1$, $G_4$ were arranged in one parallel pair, while gaps $G_2$, $G_3$ were arranged in another parallel pair, such that when the armature moved angularly, the lengths of the air gaps of each parallel pair would move proportionally to one another. Air gaps $G_1$, $G_2$, $G_3$, and $G_4$ had reluctances $R_{G1}$, $R_{G2}$, $R_{G3}$ and $R_{G4}$, respectively.

Thus, the leftward or first magnet 35 created static flux which divided between a short loop which passed through the gaps $G_1$, $G_2$ of the adjacent reciprocal pair, and a long loop which passed through the gaps $G_2$, $G_3$ of one parallel pair. Conversely, the rightward or second magnet 36 would create static flux which divided between a short loop which passed through the gaps $G_3$, $G_4$, of the adjacent reciprocal pair, and in a long loop which passed through the gaps $G_4$, $G_1$ of the other parallel pair. Since the sum of the lengths of $G_1$ and $G_2$ was constant, and the sum of the lengths of $G_3$ and $G_4$ was also constant, the total reluctance of both short loops was substantially constant at all angular positions of the armature relative to the body. However, the reluctance of the respective long loops was dependent upon the angular position of the armature. Of course, the majority of flux would take the path of least resistance. If all four air gaps were of substantially equal length when the armature was centered, each magnet's static flux would divide equally between its short and long loops. However, if the armature moved in a counterclockwise direction, so as to decrease the length of $G_2$ and $G_3$, the majority of the first magnet static flux would pass through its long loop, while the majority of the second magnet static flux would pass through its short loop. On the other hand, if the armature moved in a clockwise direction so as to narrow gaps $G_1$ and $G_4$, the majority of the second magnet static flux would pass through its long loop, while the majority of the first magnet static flux would pass through its short loop.

The equivalent magnetic circuit is shown in FIG. 5a. This circuit is seen as having four contiguous loops. The left loop included left magnet 35 and its reluctance $R_{M1}$, and the reluctances $R_{G1}$, $R_{G2}$ of gaps $G_1$, $G_2$, respectively. The right loop included right magnet 36 and its reluctance $R_{M2}$, and the reluctances $R_{G3}$, $R_{G4}$ of the adjacent air gaps $G_3$, $G_4$. The intermediate upper loop included the coil and $R_{G1}$ and $R_{G3}$. The intermediate lower loop included the coil and $R_{G2}$ and $R_{G4}$.

Thus, the first magnet static flux divided between its short loop, which included $R_{G2}$ and $R_{G1}$, and its long loop which included one of the parallel pairs of air gaps, $R_{G2}$, $R_{G3}$. Conversely, the second magnet static flux divided between its short loop, which included $R_{G4}$ and $R_{G3}$, and its long loop which included the other of the parallel pairs, $R_{G4}$, $R_{G1}$.

When energized, the control flux had numerous possible paths of travel. However, because of the higher reluctance of the magnets, the paths through $R_{G1}$, $R_{G3}$ and $R_{G2}$, $R_{G4}$ were preferred and the control flux would divide equally between these two paths because the sums of their respective reluctances were equal at all angular positions of the armature. This division is represented by the dashed lines in FIG. 5. Thus, the control flux, when superimposed on each magnet's static fluxes, created a net flux which in turn created a force on the armature.

First Embodiment of the Improved Force Motor (FIG. 6)

Referring now to FIG. 6, a first embodiment of an improved linear force motor, generally indicated at 42, is shown as including a body 43, an armature 44, a leftward or first magnet 45, a rightward or second magnet 46, a common polepiece 48, an outer or first coil 49, and an inner or second coil 50.

The body 43 is shown as being a horizontally-elongated hollow thin-walled cylindrical member having a rightwardly-facing circular vertical left inner surface 51, an opposite leftwardly-facing circular vertical right inner surface 52, and an inwardly-facing cylindrical inner surface 53 generated about horizontal axis x-x. The armature 44 is shown as being a specially-configured tubular member having an outer cylindrical surface 54 arranged in spaced facing relation to body surface 53, an annular vertical left end face 55 arranged in spaced facing relation to body surface 51, an annular vertical right end face 56 arranged in spaced facing relation to body surface 52, and an inner surface which includes (from left to right in FIG. 6) an inwardly-facing cylindrical surface 58 extending rightwardly from left end face 55, a rightwardly-facing annular vertical surface 59 extending radially outwardly therefrom, an inwardly-facing cylindrical surface 60 continuing rightwardly therefrom, a leftwardly-facing annular vertical surface 61 extending radially outwardly therefrom, and an inwardly-facing cylindrical surface 62 continuing rightwardly therefrom to join right end face 56.

Each of the magnets is shown as being in the form of a short cylinder mounted axially on the body. Specifically, the left magnet 45 has a circular vertical left face 63 axially abutting body surface 51, has an outwardly-facing cylindrical surface 64 arranged in spaced facing relation to armature surface 58, and has a circular vertical right face 65. The right magnet 46 has a circular vertical right face 66 axially abutting body surface 52, has an outwardly-facing cylindrical surface 68, and has a circular vertical left face 69. Magnets 45,46 are axially spaced but arranged so as to have their south poles (S) facing one another. These magnets are preferably formed of the same material, such as samarium cobalt, and are preferably dimensioned and proportioned equally.

The polepiece 48 is shown as being a solid spool-shaped member positioned between the magnets. Specifically, the polepiece has a circular vertical left and right vertical faces 70,71, respectively, and an outer surface which sequentially includes an outwardly- and rightwardly-facing frusto-conical surface 72 extending rightwardly from left end face 70, an outwardly-facing intermediate cylindrical surface 73, and a leftwardly- and outwardly-facing frusto-conical surface 74 continuing therefrom to join right face 71. The polepiece is of larger diameter than the magnets such that the first magnet right surface 65 axially engages a central portion of polepiece left face 70, while a radially-outward marginal portion of surface 70 is arranged in spaced facing relation to armature surface 59. Similarly, the second magnet left surface 69 engages a central portion of polepiece right face 71, while a radially-outward marginal portion of surface 71 is arranged in spaced facing relation to armature surface 61.

The outer or first coil 49 abuts body surface 53 and is arranged radially outwardly of the armature in spaced relation thereto. The inner or second coil 50 abuts polepiece surface 73 and is arranged radially inwardly of the armature in spaced relation thereto. The armature is mounted on the body by suitably suspension means (not shown) for bi-directional horizontal movement relative thereto. Details of such suspension means may be found in the aforesaid pending U.S. patent application Ser. No. 06/537,109, the aggregate disclosure of which is hereby incorporated by reference. The space between body surface 51 and armature surface 55 defines a first active air gap $G_1$, the space between armature surface 59 and polepiece 70 defines a second active air gap $G_2$, the space between polepiece surface 71 and armature surface 61 defines a third air gap $G_3$, and the space between armature surface 56 and body surface 52 defines a fourth air gap $G_4$. These four air gaps are axially spaced from one another, are of substantially constant cross-section, are of variable length, and have reluctances $R_{G1}$, $R_{G2}$, $R_{G3}$ and $R_{G4}$, respectively.

Still referring principally to FIG. 6, it will be seen that the four air gaps are arranged in two reciprocal pairs, $G_1$, $G_2$ and $G_3$, $G_4$, and in two parallel pairs, $G_1$, $G_3$ and $G_2$, $G_4$. The sum of lengths of $G_1$ and $G_2$ is a constant, and the sum of the lengths of $G_3$ and $G_4$ is also a constant. As $G_1$ and $G_3$ increase in length, $G_2$ and $G_4$ decrease in length by corresponding amounts. Thus, $G_1$, $G_2$ form one reciprocal pair, while $G_3$, $G_4$ form another reciprocal pair, in the sense that as the length of one air gap increases, the length of its reciprocal pair mate will decrease by a corresponding amount. It can also be seen that $G_1$ and $G_3$ are arranged in one parallel pair, while $G_2$ and $G_4$ are arranged in another parallel pair, in the sense that, when the armature moves axially relative to the body, the length of the air gaps of each parallel pair will move proportionally to one another. Thus, if the armature moves leftwardly relative to the body, the length of gaps $G_1$, $G_3$ will proportionally increase, while the length of gaps $G_2$, $G_4$ will proportionally decrease. If all four air gaps are of equal length when the armature is in its centered or null position relative to the body, as is preferred, then the lengths of each parallel pair will always be the same.

Figure 6A:
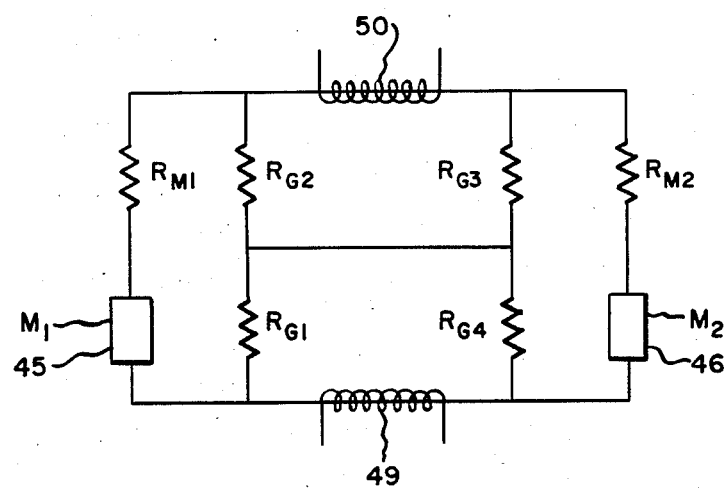
FIG. 6a is a magnetic circuit of the linear force motor shown in FIG. 6.

Referring now to FIG. 6a, the equivalent magnetic circuit is seen as having four contiguous loops. The left loop includes the left magnet 45 and its reluctance $R_{M1}$, and the reluctances $R_{G1}$ and $R_{G2}$ of the first and second air gaps $G_1$, $G_2$, respectively. Similarly, the right loop includes right magnet 46 and its reluctance $R_{M2}$, and the reluctances $R_{G3}$, $R_{G4}$ of the third and fourth air gaps $G_3$, $G_4$, respectively. The upper intermediate loop includes inner coil 50 and reluctances $R_{G2}$, $R_{G3}$, while the lower intermediate loop includes outer coil 49 and reluctances $R_{G1}$, $R_{G4}$.

Referring now to FIG. 6b, when the armature is in a centered or null position relative to the body, such that the lengths of all four air gaps are equal to one another, each magnet will create static flux which divides between a short loop passing through the adjacent reciprocal pair of air gaps, and in two long loops which pass through both parallel pairs of air gaps. Specifically, the leftward or first magnet short loop passes through air gaps $G_1$, $G_2$, while the rightward or second magnet short loop, passes through air gaps $G_3$, $G_4$. The first magnet static flux will also jump gaps $G_2$, $G_3$ and gaps $G_4$, $G_1$. Similarly, the rightward or second magnet long loop flux will jump gap $G_2$, $G_3$ and gaps $G_1$, $G_4$. If the four air gaps are of equal length, the flux will divide evenly between these various long loop paths.

FIG. 6c shows the armature as having been shifted leftwardly relative to the body such that one pair of parallel air gaps $G_1$, $G_3$ are now narrowed, while the other pair of parallel air gaps $G_2$, $G_4$ are now lengthened. In other words, $R_{G1}$ and $R_{G3}$ will be decreased, while $R_{G2}$ and $R_{G4}$ will be increased. This leftward shifting of the armature has no effect on the combined reluctance of the two magnet short loops. However, the first and second magnet's static fluxes now see the long loop paths through $G_3$, the armature, and $G_1$ as being the path of least reluctance, and the majority of such static fluxes will pass through these paths. Note that, while of opposite direction, these two static fluxes are series-aiding as they pass through gap $G_3$, the armature, and gap $G_1$.

FIG. 6d depicts the armature as having been shifted rightwardly relative to the body, such that the gaps $G_2$, $G_4$ of one parallel pair have been narrowed, while the gaps $G_1$, $G_3$ of the other parallel pair have been lengthened. The static flux issuing from each magnet's South pole will now see the long path through gaps $G_2$, the armature, and gap $G_4$ as being the path of least reluctance. Note that such fluxes are again series-aiding, but of opposite axial direction, as they pass through the armature, and the now narrowed air gaps.

Adverting now to FIG. 6, the two coils may be independently energized, with currents of desired polarity and magnitude, to create separate control fluxes, both of which pass through the armature. The control flux generated by the outer coil 49 will encircle that coil by passing through the body, air gap $G_1$, the armature, and air gap $G_4$, as represented by the dotted line in FIG. 6. However, the control flux generated by the inner coil 50 will encircle that coil by passing through polepiece 48, air gap $G_2$, the armature, and air gap $G_3$. Thus, the two control fluxes have distinctly separate paths, but pass through the common armature. If all four air gaps are of the same length when the armature is centered (i.e., as shown in FIG. 6b), then the magnets' static fluxes will be series-aiding and will pass through one of the parallel pairs of air gaps (i.e., $G_1$, $G_3$ or $G_2$, $G_4$) when the armature is subsequently moved off-center, while the inner magnet control flux will always pass through one reciprocal pair (i.e., $G_2$, $G_3$), and the outer magnet control flux will always pass through the other reciprocal pair ($G_1$, $G_4$). Of course, these two coils may be selectively energized to provide their respective control fluxes, which, when superimposed on the static fluxes, will create a net flux acting on the armature.

Second Embodiment of the Improved Force Motor (FIG. 7)

Referring now to FIG. 7, a second embodiment of the improved force motor, generally indicated at 75, is shown as including a body 76, an armature 78, a leftward or first magnet 79, a rightward or second magnet 80, a polepiece 81, and a plurality of coils, severally indicated at 82.

The body 76 is shown as being a horizontally-elongated thin-walled tubular member having a rightwardly-facing vertical circular left inner surface 83, a leftwardly-facing vertical circular right inner surface 84, and an inwardly-facing cylindrical surface 85 generated about horizontal axis x-x.

The armature 78 is shown as being a bird cage-like assembly having ring-like left and right plates 86,88 separated by a plurality of circularly-spaced horizontal bars or rods, severally indicated at 89. Specifically, the armature left plate 86 has an annular vertical left surface 90 arranged in spaced facing relation to body surface 83, has an annular vertical right face 91, has an inwardly-facing cylindrical surface 92, and has an outwardly-facing cylindrical surface 93 arranged in spaced facing relation to body surface 85. Conversely, the armature right plate 88 has an annular vertical right surface 94 arranged in spaced facing relation to body surface 84, has an opposite annular vertical left surface 95, has an inwardly-facing cylindrical surface 96, and has an inwardly-facing cylindrical surface 96, and has an outwardly-facing cylindrical surface 98 arranged in spaced facing relation to body surface 85. These end plates are joined to the opposite marginal end portions of rods 89 by means of fasteners 99, there being four of rods 89 spaced at 90° intervals.

The two magnets 79,80 are shown as being cylindrical members mounted on the body in axially-spaced relation, with their like South poles (S) arranged to face one another. The left magnet 79 has a circular vertical left face 100 axially abutting body surface 83, has an opposite circular vertical right face 101, and has an outwardly-facing cylindrical surface 102 arranged in spaced facing relation to armature left plate surface 92. Conversely, the right magnet 80 has a circular vertical right face 103 axially abutting body surface 84, has an opposite circular vertical left face 104, and has an outwardly-facing cylindrical surface 105 arranged in spaced facing relation to armature right plate surface 96.

The polepiece 81 is a horizontally-elongated solid cylindrical member having a circular vertical left face 106 abutting left magnet surface 101, having a circular vertical right face 108 abutting right magnet surface 104, and having an outwardly-facing cylindrical surface 109 spaced from body surface 85 so that rods 89 are positioned radially equidistant therebetween. It should be noted that polepiece surfaces 106,108 extend radially outwardly beyond magnet surface 101,104 and are arranged in spaced facing relation to armature left plate surface 91 and armature right plate surface 95, respectively. Thus, this second embodiment also has four axially-spaced active air gaps. The first gap $G_1$ is between body surface 83 and armature surface 90, the second gap $G_2$ is between armature surface 91 and polepiece surface 106, the third gap $G_3$ is between polepiece surface 108 and armature surface 95, and the fourth gap $G_4$ is between armature surface 94 and body surface 84. It should also be noted that the radial distances between armature surfaces 93,95 and body surface 85 are substantially greater than the combined lengths of $G_1$, $G_2$ and $G_3$, $G_4$ respectively, to prevent flux from jumping an other-than-intended air gap. Each coil is shown as being arranged between body surface 85 and polepiece surface 109, and as encircling a rod 89. Thus, whereas the first embodiment of FIG. 6 had two separate coils which could be independently energized, the second embodiment has four coils of a single type, which may be simultaneously energized, to produce control flux which encircles the coils by passing through the body, gap $G_1$, the armatures, and gap $G_4$, and/or by passing through the polepiece, gap $G_2$, the armature, and gap $G_3$, as shown by the dashed lines in FIG. 7. The force motor is preferably so designed and proportioned that, when the armature is in its centered or null position (FIG. 7), the lengths of all four air gaps will be equal to one another.

Figure 7C:
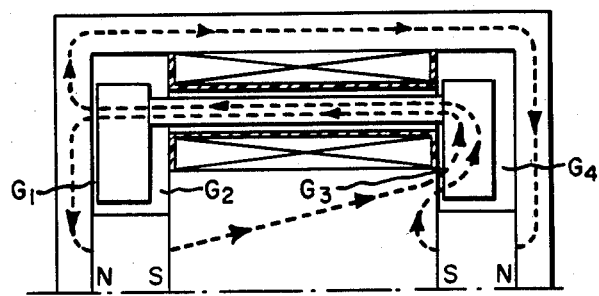
FIG. 7c is an unsectioned view of the upper portion of the force motor shown in FIG. 7, but showing the armature as having been shifted leftwardly relative to the body from the centered position shown in FIG. 7 to decrease the length of the first and third air gaps at the expense of increasing the length of the second and fourth air gaps, this view also depicting the paths and dominance of the first and second magnet long loops.
Figure 7B:
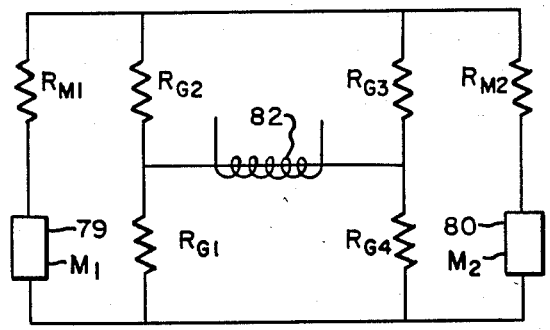
FIG. 7b is a magnetic circuit of the force motor shown in FIG. 7.

The equivalent magnetic circuit of FIG. 7b is shown as having four contiguous loops. The left loop includes left magnet 79 having a reluctance $R_{M1}$, and reluctances $R_{G1}$ and $R_{G2}$. The right loop includes right magnet 80 and its reluctance $R_{M2}$, as well as reluctances $R_{G3}$ and $R_{G4}$. The intermediate lower loop includes coil 82, and reluctances $R_{G1}$ and $R_{G4}$, while the intermediate upper loop includes coil 82, and reluctances $R_{G2}$ and $R_{G4}$.

Thus, each magnet will create static flux in a short loop passing through the adjacent reciprocal pair of air gaps, and in a long loop passing through one of the parallel pairs of air gaps (i.e., $G_1$, $G_3$ or $G_2$, $G_4$) when the armature is displaced either leftwardly or rightwardly from the centered or null position shown in FIG. 7. The first magnet short loop, will pass through gaps $G_2$ and $G_1$, whereas the second magnet short loop will pass through gaps $G_3$ $G_4$. When the armature is centered with respect to the body, all four air gaps will be of equal length, and, hence, of equal reluctance. Hence, the static flux in the two magnet long loops will divide equally between one path passing through $R_{G2}$ and $R_{G4}$, and another path passing through $R_{G3}$ and $R_{G1}$.

When the armature is shifted leftwardly relative to the body, as shown in FIG. 7c, one pair (i.e., $G_1$, $G_3$) of parallel air gaps will be narrowed, while the other pair (i.e., $G_2$, $G_4$) will be correspondingly lengthened. Thus, the path of least reluctance for each magnet's long loop will be through the narrowed pair (i.e., $G_3$, $G_1$) of parallel air gaps, and the fluxes in the long loops passing through these gaps will be increased. It should also be noted that while the flux direction of the first magnet long loop is shown as being counter-clockwise and while the flux direction of the second magnet long loop is shown as being clockwise, the fluxes in these two loops will be series-aiding when they pass through gap $G_3$, the armature, and gap $G_2$. Of course, the coils may be selectively energized to produce a control flux, of desired polarity and magnitude, which, when superimposed on the static flux pattern generated by themagnets, will create a net flux which urges the armature to move in the desired direction relative to the body.

Figure 7D:
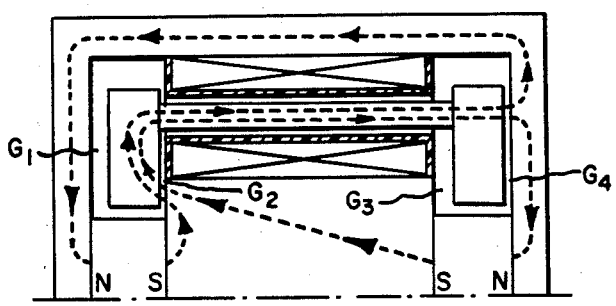
FIG. 7d is an unsectioned view of the upper portion of the force motor shown in FIG. 7, but showing the armature as having been shifted rightwardly relative to the body from the centered position shown in FIG. 7 to decrease the length of the second and fourth air gaps at the expense of increasing the length of the first and third air gaps, this view also depicting the paths and dominance of the first and second magnet long loops.

On the other hand, when the armature is shifted rightwardly relative to the body, as shown in FIG. 7d, the length of gaps $G_2$, $G_4$, will be less than the lengths of gaps $G_1$, $G_3$. In this condition, the path of least reluctance for each magnet's long loop will be through the other pair, $G_2$, $G_4$ of parallel air gaps, and the fluxes in these two loops will be increased. While the path of flux travel has changed between Figs. 7c and 7d, the direction of flux travel remains the same and continues to be series-aiding (albeit of opposite axial direction) as it passes through $G_2$, the armature, and $G_4$.

Thus, the path of majority flux travel depends upon the axial position of the armature relative to the body. It is believed that the force attributable to the static flux passing through the air gaps of the FIG. 6 and FIG. 7 embodiments will be about twice the force for the FIG. 4 embodiment.

Modifications

While two preferred embodiments of the improved linear force motor have been shown and described, persons skilled in this art will readily appreciate that various additional changes and modifications may be made. While high-reluctance rare earth alloys, such as samarium cobalt, are preferred materials of which the magnets may be formed, other types of magnet materials may be substituted therefor. If this substitution were to be made, it may be necessary to redimension the apparatus to define and limit the possible paths of flux travel because of the different permeability ($\mu$) of such alternate materials. The body, the polepieces and the armature may be formed of any type of flux-conductive material. The body, armature and polepieces may be made either integrally, or sectionally, as desired. The specific configuration of the coils (i.e., number of turns, etc.), as well as the means for selectively energizing the same, are considered to be well within the ambit of a skilled mechanic.

Therefore, while two preferred embodiments of the improved linear force motor have been shown and described, and several further modifications thereof discussed, persons skilled in this art will readily appreciate that various additional changes and modifications may be made without departing from the spirit of the invention, as defined and differentiated by the following claims.

What is claimed is:

1. A linear force motor, comprising:
a body having an elongated chamber therewithin;
an armature arranged within said chamber for axial movement therealong relative to said body, said body and armature having surfaces cooperating to form first, second, third and fourth variable-reluctance axial air gaps therebetween, said first and second air gaps being arranged in one reciprocal pair such that the sum of their lengths is constant, said third and fourth air gaps being arranged in another reciprocal pair such that the sum of their lengths is constant, said first and third air gaps forming one parallel pair such that their lengths vary proportionally when said armature moves relative to said body, and said second and fourth air gaps forming another parallel pair such that their lengths vary proportionally when said armature moves relative to said body;
magnet means mounted on said body and operatively arranged to provide static flux in said air gaps; and
coil means arranged in said chamber and selectively energizable to produce control flux in one path which passes through said first and fourth air gaps but not said second and third air gaps, and in another path which passes through said second and third air gaps but not said first and fourth air gaps.

2. A linear force motor as set forth in claim 1 wherein the lengths of said first and third air gaps will be substantially equal to one another at any position of said armature relative to said body.

3. A linear force motor as set forth in claim 1 wherein the lengths of said second and fourth air gaps will be substantially equal to one another at any position of said armature relative to said body.

4. A linear force motor as set forth in claim 1 wherein the reluctance of each air gap is substantially proportional to its length.

5. A linear force motor as set forth in claim 1 wherein said magnet means includes a first magnet having a surface facing into said first and second air gaps.

6. A linear force motor as set forth in claim 5 wherein said first magnet is arranged radially inwardly of said chamber.

7. A linear force motor as set forth in claim 5 wherein the reluctance of said first magnet is greater than the sum of the reluctances of said first and second air gaps.

8. A linear force motor as set forth in claim 7 wherein said first magnet is arranged to create static flux in a short loop passing through said first and second air gaps and in a long loop passing through a parallel pair of air gaps.

9. A linear force motor as set forth in claim 8 wherein said first magnet long loop passes through said first and third air gaps when the sum of the reluctances of said first and third air gaps is less than the sum of the reluctances of said second and fourth air gaps.

10. A linear force motor as set forth in claim 8 wherein said first magnet long loop passes through said second and fourth air gaps when the sume of the reluctances of said second and fourth air gaps is less than the sum of the reluctances of said first and third air gaps.

11. A linear force motor as set forth in claim 1 wherein said magnet means includes a second magnet having a surface facing into said third and fourth air gaps.

12. A linear force motor as set forth in claim 11 wherein said second magnet is arranged radially inwardly of said chamber.

13. A linear force motor as set forth in claim 11 wherein the reluctance of said second magnet is greater than the sum of the reluctances of said third and fourth air gaps.

14. A linear force motor as set forth in claim 13 wherein said second magnet is arranged to create static flux in a short loop passing through said third and fourth air gaps and in a long loop passing through a parallel pair of air gaps.

15. A linear force motor as set forth in claim 14 wherein said second magnet long loop passes through said first and third air gaps when the sum of the reluctances of said first and third air gaps is less than the sum of the reluctances of said second and fourth air gaps.

16. A linear force motor as set forth in claim 14 wherein said second magnet long loop passes through said second and fourth air gaps when the sum of the reluctances of said second and fourth air gaps is less than the sum of the reluctances of said first and third air gaps.

17. A linear force motor as set forth in claim 1 wherein said coil means includes a coil operatively arranged to produce a coil flux in said one path and in said other path.

18. A linear force motor as set forth in claim 17 wherein said coil is mounted on said body.

19. A linear force motor as set forth in claim 1 wherein said coil means includes a plurality of coils, each of which produces a coil flux in said one path and in said other path.

20. A linear force motor as set forth in claim 19 wherein said armature includes a plurality of rods, and wherein each of said coils encircles a rod.

21. A linear force motor as set forth in claim 20 wherein each of said coils is mounted on said body.

22. A linear force motor as set forth in claim 1 wherein said coil means includes a first coil operatively arranged to produce a first control flux which passes through said first and fourth air gaps, and includes a second coil operatively arranged to produce a second control flux which passes through said second and third air gaps.

23. A linear force motor as set forth in claim 22 wherein said first coil is arranged radially outwardly of said armature and said second coil is arranged radially inwardly of said armature.

* * * * *